US009361855B2

(12) United States Patent
Tjissen

(10) Patent No.: US 9,361,855 B2
(45) Date of Patent: Jun. 7, 2016

(54) COMPUTER-IMPLEMENTED METHODS AND SYSTEMS FOR A COLOR GENERATOR

(75) Inventor: Remon Tjissen, Mill Valley, CA (US)

(73) Assignee: Adobe Systems Incorporated, San Jose, CA (US)

(*) Notice: Subject to any disclaimer, the term of this patent is extended or adjusted under 35 U.S.C. 154(b) by 742 days.

(21) Appl. No.: 13/506,744

(22) Filed: May 14, 2012

(65) Prior Publication Data

US 2014/0285508 A1    Sep. 25, 2014

(51) Int. Cl.
*G09G 5/02* (2006.01)
*G06F 3/0484* (2013.01)
*G01J 3/52* (2006.01)
*G01J 3/46* (2006.01)

(52) U.S. Cl.
CPC ... *G09G 5/02* (2013.01); *G01J 3/52* (2013.01); *G06F 3/0484* (2013.01); *G06F 3/04847* (2013.01); *G01J 3/462* (2013.01); *G09G 2320/0606* (2013.01)

(58) Field of Classification Search
CPC ......... G06F 3/04847; G06F 3/00; G06F 3/01; G06F 3/048; G06F 3/0484
See application file for complete search history.

(56) References Cited

U.S. PATENT DOCUMENTS

| | | | | |
|---|---|---|---|---|
| 5,270,806 A * | 12/1993 | Venable et al. | ............... | 358/500 |
| 5,311,212 A * | 5/1994 | Beretta | ............... | G06F 3/04845 345/591 |
| 5,426,289 A * | 6/1995 | Kinoshita | ............... | G06K 19/06 235/469 |
| 5,461,493 A * | 10/1995 | Venable | ........................ | 358/520 |
| 5,861,871 A * | 1/1999 | Venable | ........................ | 708/200 |
| 5,903,255 A * | 5/1999 | Busch et al. | .................. | 345/594 |
| 5,909,220 A * | 6/1999 | Sandow | ..................... | 345/589 |
| 5,963,201 A * | 10/1999 | McGreggor | ......... | H04N 1/6058 345/549 |
| 6,226,010 B1 * | 5/2001 | Long | ..................... | G06T 11/001 345/594 |
| 6,456,293 B1 * | 9/2002 | Grandy | .................... | H04N 1/60 345/590 |
| 6,606,166 B1 * | 8/2003 | Knoll | ............................. | 358/1.9 |
| 6,697,079 B2 * | 2/2004 | Rose | ........................ | G09G 5/02 345/593 |
| 6,758,574 B1 * | 7/2004 | Roberts | ................ | H04N 1/6011 362/162 |
| 6,870,544 B2 * | 3/2005 | Blanchard | ........... | G06F 3/04845 345/589 |

(Continued)

*Primary Examiner* — Phi Hoang
*Assistant Examiner* — Charles L Beard
(74) *Attorney, Agent, or Firm* — Kilpatrick Townsend & Stockton LLP

(57) ABSTRACT

One exemplary embodiment involves a computer-implemented method that comprises rendering, by a processor, an interface comprising a synopsis node and a plurality of configurable component nodes, each of the component nodes corresponding to a respective color, and the synopsis node having a color that is a combination of the colors of the synopsis node. The method additionally includes, receiving, by the processor, input changing an influence of a first component node and determining, by the processor, a change in the color of the synopsis node based on the received input, wherein the change represents a combination of the colors of the component nodes. Additionally, the method includes rendering, by the processor, the changed synopsis node color in the synopsis node.

24 Claims, 11 Drawing Sheets
(8 of 11 Drawing Sheet(s) Filed in Color)

(56) References Cited

U.S. PATENT DOCUMENTS

| | | | |
|---|---|---|---|
| 6,879,327 B1* | 4/2005 | Mathur et al. ............... 345/589 |
| 7,136,074 B2* | 11/2006 | Hussie .................. G01J 3/52 345/591 |
| 7,180,524 B1* | 2/2007 | Axelrod ................ G09G 5/02 345/593 |
| 7,502,033 B1* | 3/2009 | Axelrod ................ G09G 5/06 345/440 |
| 7,852,514 B1* | 12/2010 | Chinn et al. ................... 358/2.1 |
| 7,928,991 B2* | 4/2011 | Moran ............... G06F 9/4443 345/589 |
| 8,013,869 B2* | 9/2011 | Voliter .............. G06F 3/04845 345/418 |
| 8,049,926 B2* | 11/2011 | Hayward et al. .............. 358/1.9 |
| 8,085,276 B2* | 12/2011 | Voliter et al. ................. 345/589 |
| 8,089,482 B1* | 1/2012 | Axelrod ....................... 345/440 |
| 8,154,561 B1* | 4/2012 | Voliter ................ G06T 11/001 345/594 |
| 8,233,707 B2* | 7/2012 | Chien et al. ................... 382/162 |
| 8,405,868 B2* | 3/2013 | Jackson ......................... 358/1.9 |
| 8,699,826 B2* | 4/2014 | Remedios .................... 382/305 |
| 9,003,334 B2* | 4/2015 | Kukulski ............ G06F 3/04845 345/157 |
| 9,182,813 B2* | 11/2015 | Ye .......................... G06F 3/01 |
| 2004/0164991 A1* | 8/2004 | Rose ............................. 345/589 |
| 2004/0258302 A1* | 12/2004 | Miwa ..................... G06T 5/008 382/167 |
| 2006/0001665 A1* | 1/2006 | Kupersmit ..................... 345/426 |
| 2006/0044324 A1* | 3/2006 | Shum ................... G06T 11/001 345/595 |
| 2008/0062192 A1* | 3/2008 | Voliter ................ G06F 3/04845 345/591 |
| 2008/0258590 A1* | 10/2008 | Van De Sluis et al. ....... 312/237 |
| 2008/0284869 A1* | 11/2008 | Utsugi ................... G06T 7/408 348/222.1 |
| 2009/0128672 A1* | 5/2009 | Watanabe ............. G02B 5/201 348/273 |
| 2009/0262130 A1* | 10/2009 | Ramirez ....................... 345/595 |
| 2010/0085587 A1* | 4/2010 | Hayward et al. .............. 358/1.9 |
| 2010/0171444 A1* | 7/2010 | Bennette ....................... 315/312 |
| 2010/0301780 A1* | 12/2010 | Vinkenvleugel ........ F21V 23/04 315/362 |
| 2010/0308755 A1* | 12/2010 | Van Liempd et al. ......... 315/363 |
| 2012/0036480 A1* | 2/2012 | Warner ............... G06F 3/04847 715/833 |
| 2013/0044123 A1* | 2/2013 | Shah et al. ..................... 345/594 |
| 2013/0335333 A1* | 12/2013 | Kukulski ........... G06F 3/04845 345/173 |

* cited by examiner

COMPUTER-IMPLEMENTED METHODS AND SYSTEMS FOR A COLOR GENERATOR

FIELD

This disclosure relates generally to computer software and more particularly relates to the creation, modification, use, and distribution of electronic content.

BACKGROUND

Conventional color palettes and color pickers that are available through computer applications and/or operating systems present a wide array of colors in a grid or list format. The colors may be arranged at random or in specific order allowing for the selection from a finite set of colors. Additionally, the number of colors presented in a color palette may vary based on a pixel depth of a computer system. For example, the number of colors available for selection from the finite set may range from 16 to 256 colors. However, identifying new colors possibilities can be limiting when the colors are arranged as a grid, and creating a new color not presented in the color palette that is contextual to the current color set or a selection thereof may be difficult.

SUMMARY

One exemplary embodiment involves rendering an interface that includes a synopsis node and one or more configurable component nodes. Each of the component nodes may correspond to a color and the synopsis node may be a combination of the colors of the component nodes. The embodiment involves receiving an input for changing an influence of a first component node and determining a change in the color of the synopsis node based on the received input. The changed color may represent combination of the colors of the component nodes. Additionally, the embodiment involves rendering the changed synopsis node color in the synopsis node.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where.

DETAILED DESCRIPTION

Figure 1:
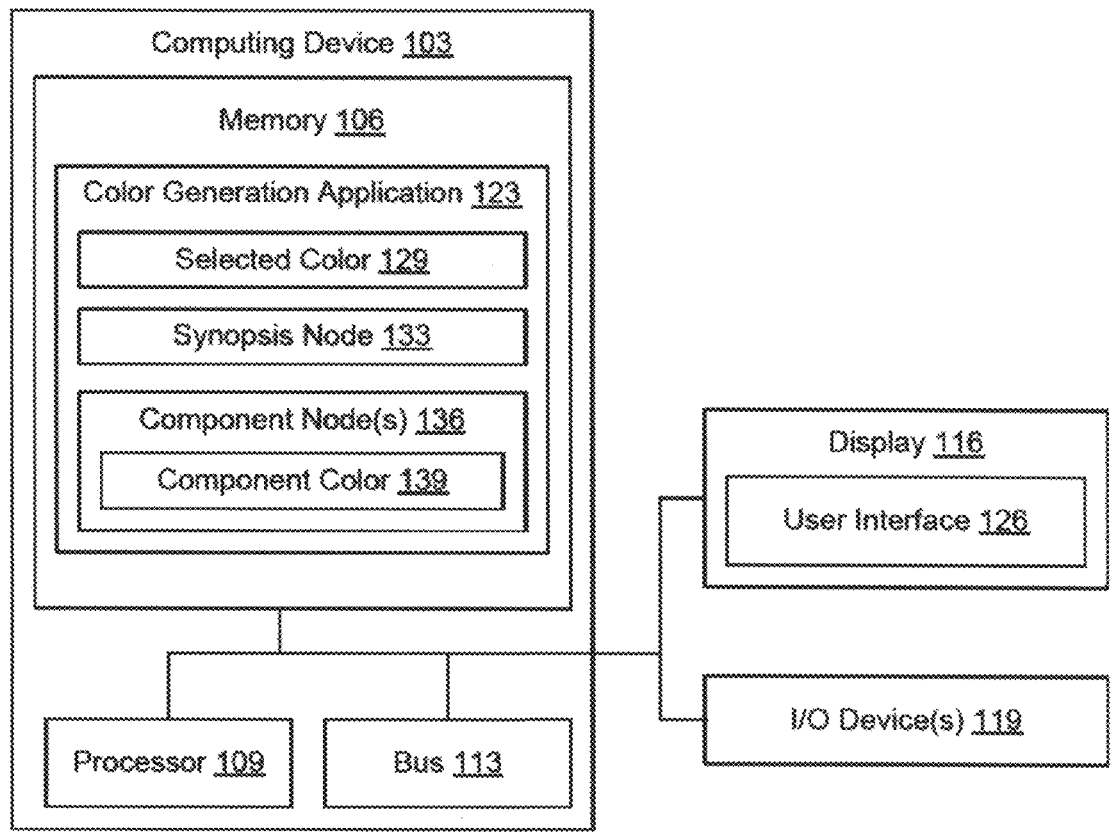
FIG. 1 is a block diagram depicting exemplary computing devices in an exemplary computing environment for implementing certain embodiments.

Methods and systems are disclosed for graphically depicting relationships between input colors to visualize and create combined colors. Discloses are embodiments for rendering a color generator to generate a color based on a plurality of component colors. The color generator includes one or more component nodes that are each associated with one of the component colors. Additionally, the color generator includes a synopsis node that is associated with a synopsis color determined from a combination of at least two of the component colors. In one embodiment, a user manipulates the component nodes to select the component colors and adjust the location of the component nodes with respect to the synopsis node. In response, the color generator may adjust the influence by the component color on the synopsis color. For example, the influence by each of the component colors on the synopsis color is based at least in part on a distance between the respective component node and the synopsis node and a location of the component node with respect to the synopsis node.

Additionally, each component node is associated with a halo radiating from the component node. In one embodiment, the radius of the halo corresponds to the distance between the respective component node and the synopsis node. The halo has a halo color that corresponds to the component color. Further, the halo color may have a luminosity that corresponds to the distance between the respective component node and the synopsis node. In one embodiment, the luminosity is determined by a weighted sum of the nonlinear red, green, and blue (RGB) signals. (This may be applied to any color value with its own RGB value combinations). In one embodiment, the luminosity of the halo color determines a brightness and/or saturation of the halo color. For example, the luminosity of the halo color may increase as the distance between the respective component node and the synopsis node decreases. Stated another way, the luminosity of the halo color increases as the proximity of the component node to the synopsis node increases. Additionally, the luminosity of the halo color corresponds to a percentage of the component color that will be applied to create the synopsis color, as will be described. Thus, in one embodiment, adjusting the distance between one of the component nodes and the synopsis node causes a change in the size of the halo of the component node and in the luminosity of the color of the halo.

The halos of the component nodes may intersect and create a convergence area that has a convergence color. For example, two or more of the halos associated with the component nodes may converge creating a convergence color that is a combination of the halo colors. In one embodiment, the color of the synopsis color corresponds to the convergence color. For example, the synopsis color may correspond to the convergence color of a convergence that results when all of the halos of the component nodes converge. In another embodiment, another convergence color may be selected where the selected convergence color results from a convergence of only a subset of the all of the halos.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 119. In one embodiment, the input/output device 119 may include a number of external or internal devices such as a mouse, a CD-ROM, DVD, a keyboard, a display, audio speakers, one or more microphones, or any other input or output devices. Additionally, the computing device 103 may be a personal computing device, a mobile device, or any other type of electronic devices appropriate for providing one or more of the features described herein.

As used here, the term "device" refers to any computing or other electronic equipment that executes instructions and includes any type of processor-based equipment that operates an operating system or otherwise executes instructions. A device will typically include a processor 109, which may comprise one or more processors, that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on a suitable processor. For example, as shown the computing device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes a color generation application 123 that renders the color generator in the user interface 126 displayed on the display 116. Included in the color generator is a selected color 129, a synopsis node 133, and one or more component nodes 136. Each of the component nodes 136 is associated with a component color 139. In one embodiment, the synopsis node 133 depicts the selected color 129 that is generated based on the component colors 139 of the one or more component nodes 136. For instance, the selected color 129 represents a convergence color derived from the convergence of two or more halos associated with the component nodes 136, as will be described.

Once derived, the selected color 129 may be exported for use by one or more applications. For example, the selected color 129 may be saved and transferable for use in other applications. In one embodiment, the selected color 129 may be exported for use in applications such as Adobe® Kuler®, Adobe® Photoshop®, Adobe® Illustrator®, Microsoft® Windows®, Microsoft® Paint®, Microsoft® Office®, Google® SketchUp, AutoCAD®, and/or other applications. Additionally, the approach described herein for deriving the selected color 129 may be used as an educational tool for graphically depicting how colors are derived from one or more input and/or component colors 139.

Figure 2:
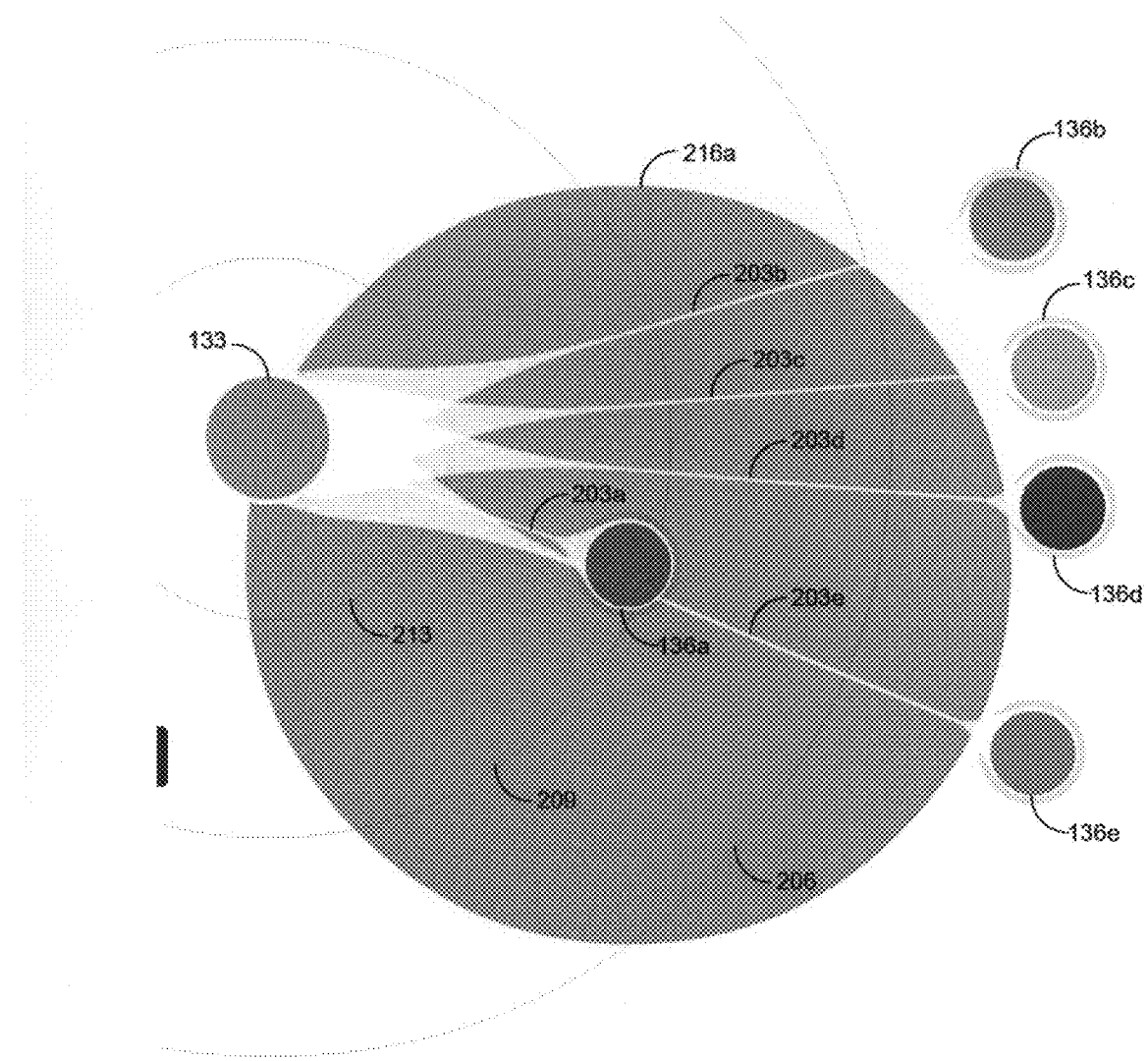
FIG. 2 illustrates an exemplary user interface depicting a color generator with a first component node located within a boundary.

FIG. 2 shows one example of a user interface 126 according to certain embodiments of the present disclosure that is rendered on the display 116. In this example, the user interface 126 depicts the color generator rendered by the color generation application 123. Shown in FIG. 2 are a synopsis node 133; component nodes, 136a, 136b, 136c, 136d, and 136d; component edges, 203a, 203b, 203c, 203d, and 203e; an outer color generator boundary 206; a color generator midpoint 209; an inner color generator boundary 213; and a halo 216a. Each of the component edges 203 are associated with a respective one of the component nodes 136. Additionally, the halo 216a is associated with the component node 136a. Further, FIG. 2 depicts only a portion of the color generator. For example, the outer color generator boundary 206, the color generator midpoint 209, and the inner color generator boundary 213 form a complete circle and/or another shape. Additional component nodes 136 may be displaced around the color generator, some of which are not depicted in FIG. 2.

In one embodiment, the size of the halo 216a is based on the length of the component edge 203a associated with the component node 136a, i.e., the distance from the synopsis node 133. For example, the halo 216a may have a radius that corresponds to the length of the component edge 203a. The length of the component edge 203a may be measured from the midpoint of the component node 136a to the midpoint of the synopsis node 133. Additionally, the halo 216 is associated with a halo color that corresponds to the component color 139 of the component node 136a. In one embodiment, the luminosity of the halo color for the halo 216a depends on the distance between the component node 136a and the synopsis node 133. For example, the length of component edge 203a (i.e., the radius of the halo 216a) may determine the luminosity of the halo color. To this end, a smaller length for the component edge 203a (ie, a smaller radius of the halo 216a) may indicate a higher luminosity of the halo color than a larger length for the component edge 203a. Thus, the halo color is brighter when the component node 136a is closer the component node 203a is to the synopsis node 133. As shown in FIG. 2, the component node 136a is located near the color generator midpoint 209 and is thus nearly at the midpoint between the outer color generator boundary 206 and the inner color generator boundary 213. Accordingly, the luminosity of the halo color for the halo 216a is near 50%.

Additionally, the halo 216 associated with each component node 136 may be visible once the component node 136 is adjusted to be within the outer color generator boundary 206. For example, in FIG. 2, the component node 136a is located inside of the outer color generator boundary 206 and thus the halo 216a associated with the component node 136a is visible. However, component nodes 136b, 136c, 136d, and 136e are located outside the outer color generator boundary 206 and therefore their respective halos are not visible. Further, as shown in FIG. 2, the selected color 129 (FIG. 1) as indicated by the synopsis node 133 corresponds to the halo color of the halo 216a. The selected color 129 corresponds to the convergence color of the convergence of two or more halos 216 associated with component nodes 136 located within the outer color generator boundary 206. In this example, only one halo 216 is visible and therefore, the selected color 129 corresponds to the halo color of the visible halo 216.

A user manipulating the user interface may adjust the location of the component node 136a or any of the other component nodes 136 with respect to the synopsis node 133. For example, the user may adjust the location of the component node 136a via a touch input device, mouse and/or another input device by selecting the component node 136a and indicate a location to where the component node 136a should be adjusted. In another embodiment, the user may drag the component node 136a to the desired location via the touch input device. Additionally, the user may select a component color 139 of the component node 136a via the touch input device and/or other input device. Further, the user may simultaneously adjust the location of more than one of the component nodes 136 via the touch input device, mouse, and/or another input device.

Figure 3:
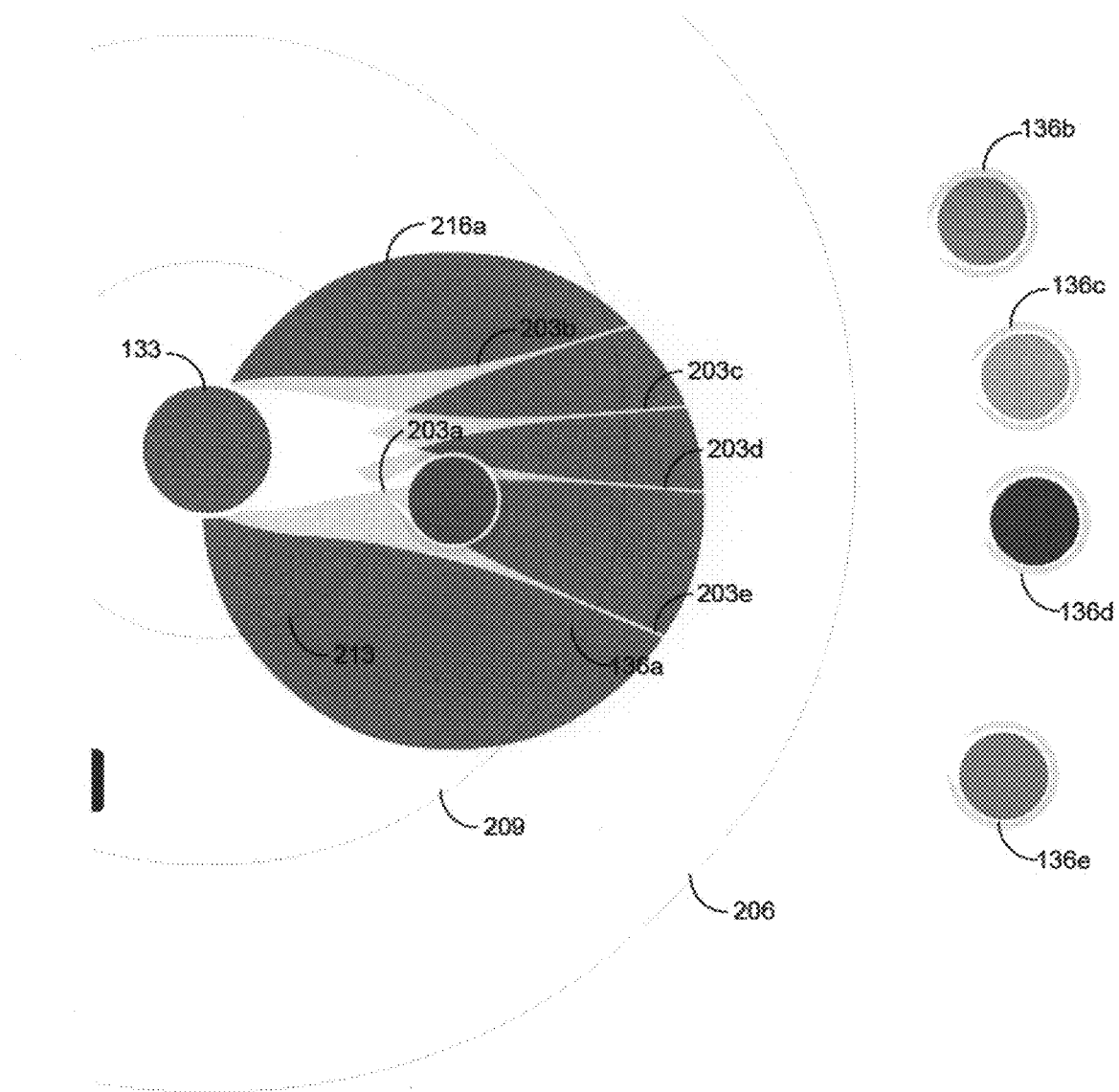
FIG. 3 illustrates an exemplary user interface depicting a color generator with the first component node adjusted to be located closer to a synopsis node.

FIG. 3 shows one example of a user interface 126 according to certain embodiments of the present disclosure that is rendered on the display 116. In this example, the user interface 126 depicts the color generator rendered by the color generation application 123 (FIG. 1). In this example, the user interface 126 depicts a synopsis node 133, component nodes, 136a, 136b, 136c, 136d, and 136e, component edges, 203a, 203b, 203c, 203d, and 203e, an outer color generator boundary 206, a color generator midpoint 209, a inner color generator boundary 213, and a halo 216a similar to FIG. 2. The luminosity of the halo color of a halo 216 associated with a component node 136 appearing on or within the inner color generator boundary 213 may be 100% while the luminosity of the halo color of a halo 216 associated with a component node 136 appearing on or outside of the outer color generator boundary 206 may be 0%. Here, the component node 136a appears closer to the synopsis node 133 than in FIG. 2 and thus the halo color of the halo 216a appears more saturated than the halo color of the halo 216a of FIG. 2. For example, a user manipulating the user interface 126 may drag the component node 136a to be closer to the synopsis node 133 via a touch input device. In response, the luminosity of the halo color of the halo 216a may be approximately 90% resulting from the distance between the component node 136a and the synopsis node 133. Additionally, the selected color 129 (FIG. 1) depicted in the synopsis node 133 corresponds to the halo color of the halo 216a. The synopsis color 133 in FIG. 3 is more intense than the synopsis color 133 in FIG. 2 because the halo color of the halo 216a has a higher luminosity. Further, the halo 216a is smaller than in FIG. 2 because the component edge 203a is smaller thereby reducing the radius of the halo 216a.

Figure 4:
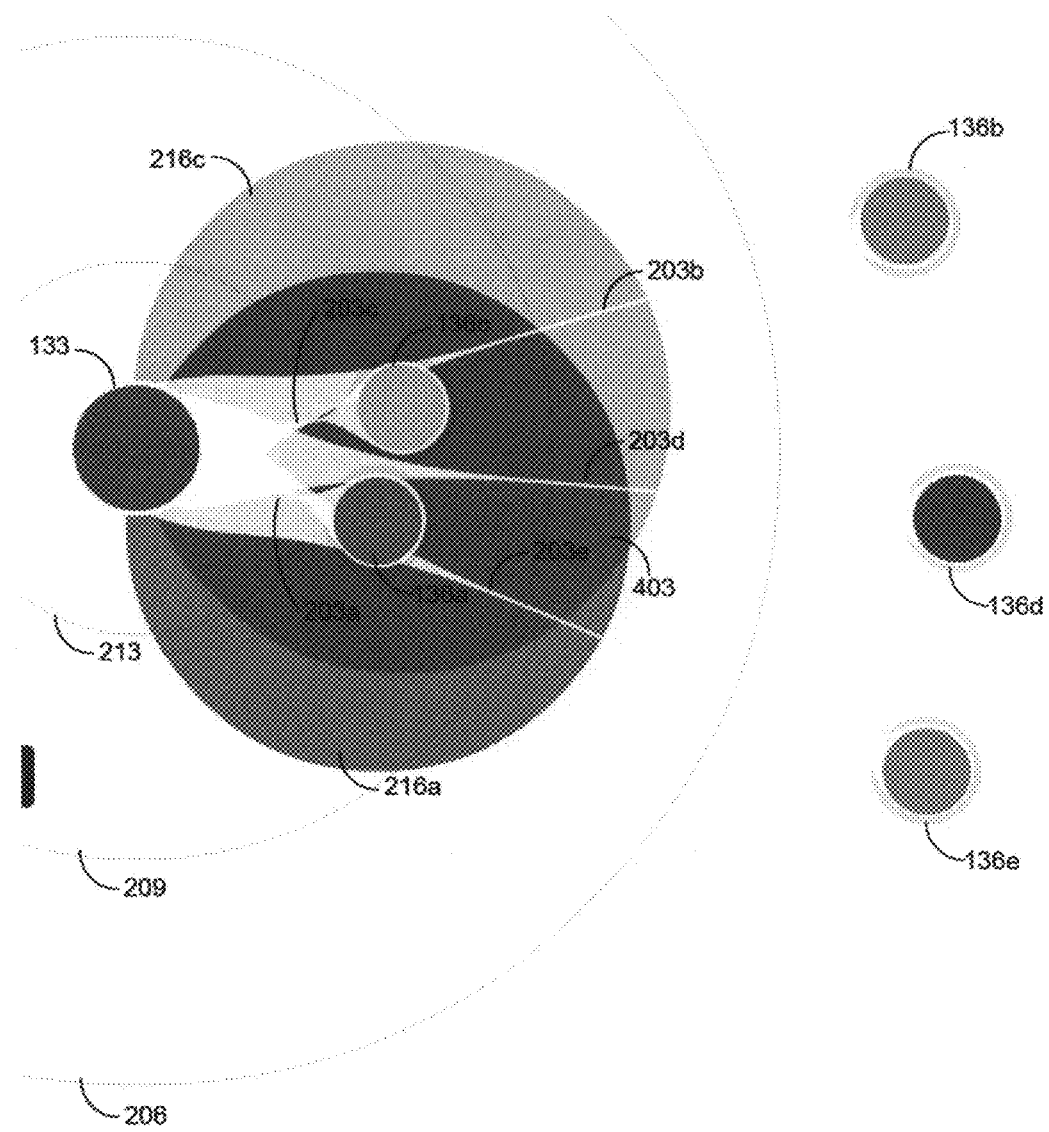
FIG. 4 illustrates an exemplary user interface depicting a color generator with the first component node and a second component node located within the boundary.

FIG. 4 shows one example of a user interface 126 according to certain embodiments of the present disclosure that is rendered on the display 116. In this example, the user interface 126 depicts the color generator rendered by the color generation application 123 (FIG. 1). As shown in FIG. 4, the user interface 126 depicts a synopsis node 133; component nodes 136a, 136b, 136c, 136d, and 136e; component edges 203a, 203b, 203c, 203d, and 203e; an outer color generator boundary 206; a color generator midpoint 209; a inner color generator boundary 213; and a halo 216a similar to FIG. 3. Additionally, the user interface 126 of FIG. 4 depicts a halo 216c associated with the component node 136c and a convergence 403 formed from the convergence of the halo 216a associated with the component node 136a and the halo 216c associated with the component node 136c.

In this example, the component node 136c appears within the outer color generation boundary 206 and thus the halo 216c associated with component node 136c is visible. For example, the luminosity of the halo color for the halo 216c is greater than 0% if the component node 136c is located within the outer color generator boundary 206, as discussed above. Here, the component node 136c appears to be located close to the inner color generator boundary 213 and thus the luminosity of the halo color for the halo 216c is closer to 100%. For instance, the luminosity of the halo color for the halo 216c is similar to the luminosity of the halo color for the halo 216a because the distance between the component node 136c and the synopsis node 133 is similar to the distance between the component node 136a and the synopsis node 133.

Additionally, FIG. 4 depicts the convergence 403 that forms when the halo 216a converges with the halo 216c. The convergence 403 is represented by the area where both the halo 216a and the halo 216c be intersect and has a convergence color that represents a combination and/or a mixture of the halo color of the halo 216a and the halo color of the halo 216c. For example, the halo color of the halo 216a is blue and the halo color of the halo 216c is yellow. Accordingly, the convergence color of the convergence 403 is green because the combination of blue and yellow is green, as can be appreciated. Further, the luminosity of the convergence color corresponds to the luminosity of the halo colors of the respective halos 216. As described above, the luminosity of the halos 216a and 216c is near 100% based on the distance between the respective component nodes 136a and 136c and the synopsis node 133. The convergence color may be modified by adjusting the luminosity of the halo colors of the halos 216 forming the convergence 403. For example, the luminosity of the halo colors of the halos 216 may be adjusted by moving the respective component nodes 136 of the halos 216 closer to and/or farther away from the synopsis node 133. In one embodiment, adjusting the luminosity of the halo colors effects the influence of the halo color on the convergence color. For example, increasing the luminosity of the halo color increases the influence of the halo color on the convergence color and decreasing the luminosity of the halo color decreases the influence of the halo color on the convergence color.

As a further example, the component node 136a may be adjusted to be closer to the synopsis node 133 thereby increasing the luminosity of the blue halo color of the halo 216a. An increased luminosity of the blue halo color of the halo 216a may make the halo color of the halo 216a a brighter blue. Additionally, the halo 216a may be smaller as the radius of the halo 216a decreases when the component node 136a moves closer to the synopsis node 133. Accordingly, the shape of the convergence 403 may change based on the smaller halo 216a and the convergence color of the convergence 403 may be a combination of the brighter blue of the halo 216a and the yellow of the halo 216c.

Additionally, the selected color 129 as depicted in the synopsis node 133 corresponds to the convergence color of the convergence 403. As previously discussed, the selected color 129 corresponds to the convergence color of the convergence involving all of the halos 216 associated with component nodes 136 located within the outer color generator boundary 206. As shown in FIG. 4, only two halos 216 are depicted as only two of the component nodes 136 are located within the outer color generator boundary 206. Therefore, the selected color 129 corresponds to the convergence color of the convergence 403 formed by the halos 216 associated with component nodes 136a and 136c.

Figure 5:
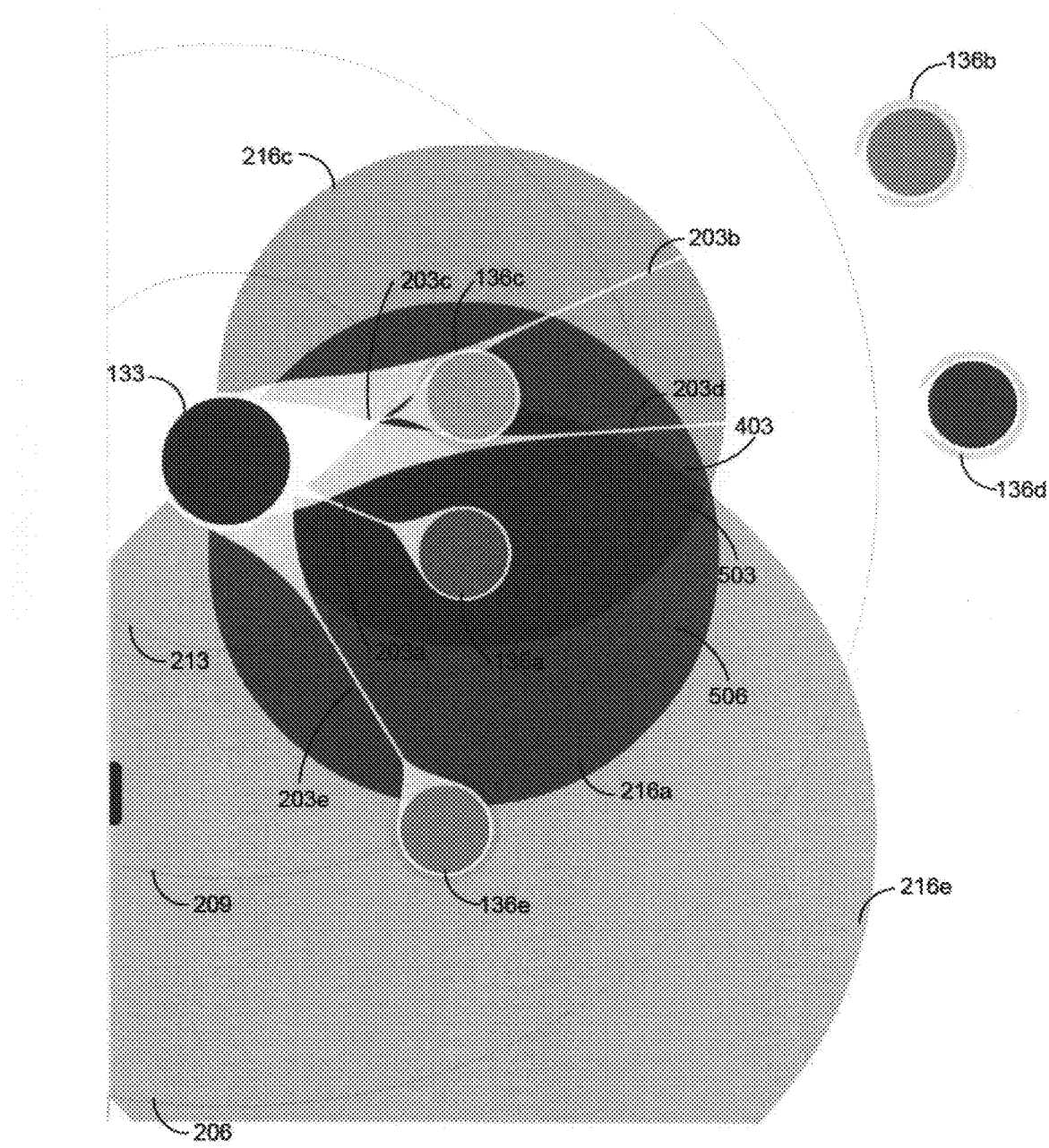
FIG. 5 illustrates an exemplary user interface depicting a color generator with the first component node, the second component node, and a third component node located within the boundary.

FIG. 5 shows one example of a user interface 126 according to certain embodiments of the present disclosure that is rendered on the display 116. In this example, the user interface 126 depicts the color generator rendered by the color generation application 123 (FIG. 1). As shown in FIG. 5, the user interface 126 depicts a synopsis node 133; component nodes 136a, 136b, 136c, 136d, and 136e; component edges, 203a, 203b, 203c, 203d, and 203e; an outer color generator boundary 206, a color generator midpoint 209; a inner color generator boundary 213; halos 216a and 216c; and a convergence 403. Additionally, the user interface 126 of FIG. 5 depicts a halo 216e associated with the component node 136e and convergences 503 and 506.

In this example, the user may have adjusted the component node 136e to be located within the outer color generator boundary 206. For example, the user may have adjusted the component node 136e by manipulating the user interface 126 to via a touch input device and/or other input device to select the component node 136e and indicate the new location to be within the outer color generator boundary 206. Due to the component node 136e being located within the outer color generator boundary 206, the halo 216e associated with the component node 136e becomes visible. For example, the luminosity of the halo 216e becomes greater than zero when the component node 136e is on or within the outer color generator boundary 206. Further, the luminosity of the halo color associated with the halo 216e depends on the distance between the corresponding component node 136e and the synopsis node 133. As shown in FIG. 5, the component node 136e appears near the color generator midpoint 209 and thus the luminosity of the halo color of the halo 216e is approximately 50%. Additionally, the halo 216e has a radius defined by the length of the component edge 203e. In this example, the component edge 203e associated with the component node 136e is larger than the component edges 203a and 203c associated with the component nodes 136a and 136c. Accordingly, the halo 216e associated with the component node 136e is larger than the halos 216a and 216c associated with the component nodes 136a and 136c.

The convergence 403 is formed from the convergence of the halo 216a associated with the component node 136a and the halo 216c associated with the component node 136c, as described above. As shown in FIG. 5, the convergence 403 is partially masked by convergence 503 in part because the halo 216e does not reach the convergence 403. In particular, the convergence 503 is formed from the convergence of the halo 216a associated with the component node 136a, the halo 216c associated with the component node 136c, and the halo 216e associated with the component node 136e. The convergence color of the convergence 503 is a combination of the halo colors of the halos 216a, 216c, and 216e. For instance, the convergence color is a combination of blue, yellow, and orange.

Additionally, the convergence color of the convergence 503 has a luminosity that corresponds to the luminosity of the halo colors associated with the halos 216 involved in the convergence 503. For example, the luminosity of the halo colors of a halo 216 corresponds to a percentage of the component color 139 (FIG. 1) associated with the respective halo 216 that will be applied to create the synopsis color 133. As shown in FIG. 5, the blue halo color of the halo 216a and the yellow halo color of the halo 216c are of a luminosity near 100% based on the respective distance between the associated component nodes 136a and 136c and the synopsis node 133, as described above. The orange halo color of the halo 216e is of a luminosity near 50% based on the distance between the component node 136e and the synopsis node 133, as described above. The luminosity of each of the halo colors of each of the respective halos 216 may be adjusted to effect a change in the convergence color, as described above. For example, the corresponding component nodes 136 may be adjusted to be closer to and/or farther away from the synopsis node 133 to adjust the luminosity of the halo color.

The convergence 506 is formed from the convergence of the halo 216a associated with the component node 136a and the halo 216e associated with the component node 136e. In this example, the convergence 506 may be of a larger area than the convergence 403 and 503 based in part on the size of the halo 216e. The halo 216e is large than the halos 216a and 216c because the component node 136e associated with the halo 216e is located farther away from the synopsis node 133 than the component nodes 136a and 136c. Accordingly, the radius of the halo 216e is larger than the radii of the halos 216a and 216c.

Additionally, convergence color of the convergence 506 is based on the combination of the halo color of the halo 216a and the halo color of the halo 216e. For instance, the convergence color is a combination of the blue halo color of the halo 216a and the orange halo color of the halo 216e. Further, the luminosity of the convergence color of the convergence 506 is based on the luminosity of the halos 216a and 216e, as described above. The convergence color of the convergence 506 may be influenced by adjusting the luminosity of the halo colors, as described above. Additionally, the selected color 129 as depicted by the synopsis node 133 does not reflect the convergence color of the convergence 506. As discussed above, the selected color 129 represents the color associated with the convergence of all of the halos 216 associated with component nodes 136 located within the outer color generator boundary 206. The convergence 506 does not involve halo 216c and therefore the selected color does not correspond to the convergence color of the convergence 506.

In one embodiment, the convergence color of the convergence 506 may be manually selected to be the selected color 129. For example, a user may select the convergence color of the convergence 506 via a touch input device, a mouse and/or another input device by clicking on the convergence 506. In response, the synopsis node 133 may adopt the convergence color of the convergence 506 and push the component nodes 136 that are not involved with the convergence 506 outside of the outer color generator boundary 206, as will be described with respect to FIGS. 6 and 7.

Figure 6:
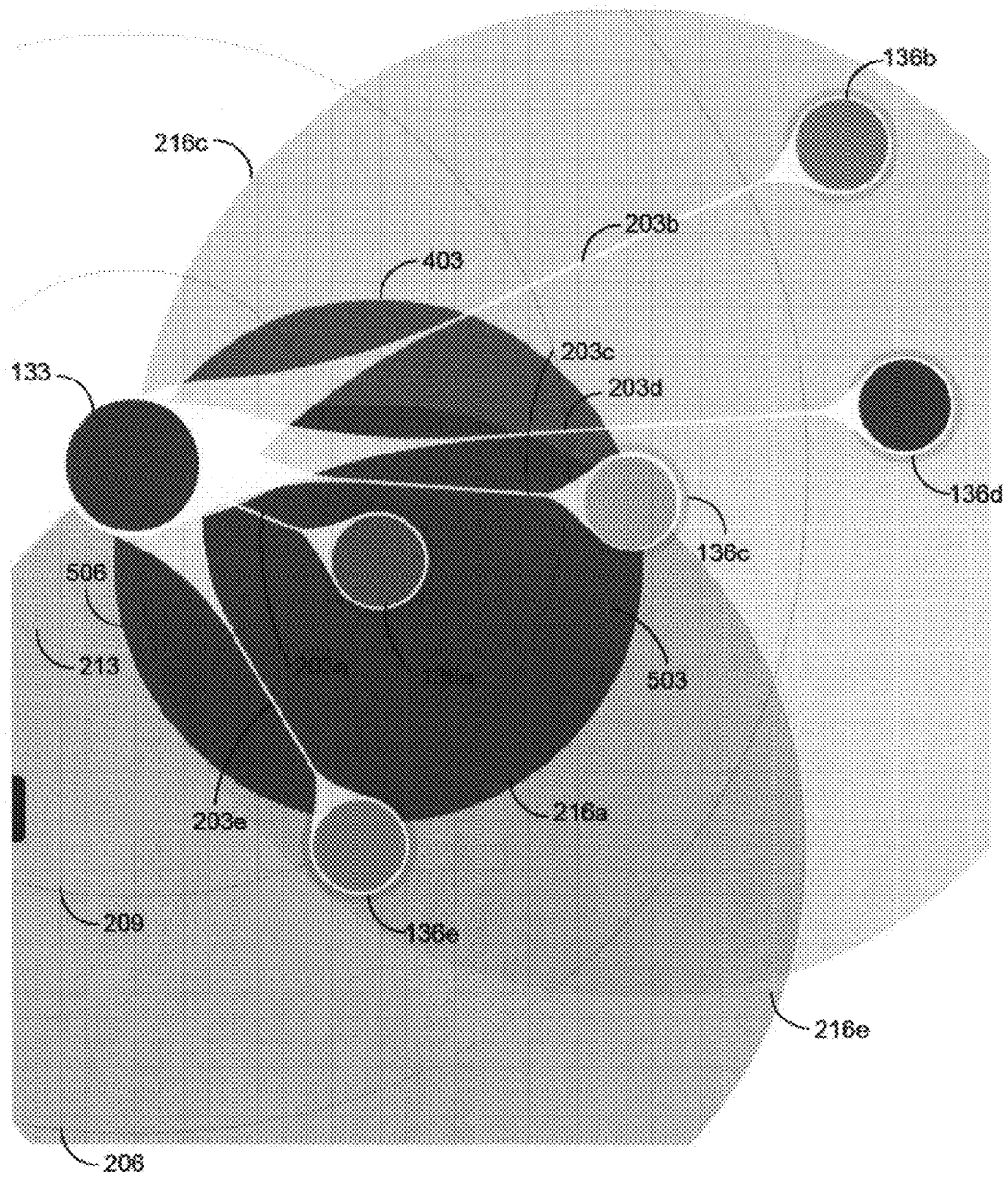
FIG. 6 illustrates an exemplary user interface depicting a color generator with pushing the second component node out of the boundary in response to a user selection.

FIG. 6 shows one example of a user interface 126 according to certain embodiments of the present disclosure that is rendered on the display 116. In this example, the user interface 126 depicts the color generator rendered by the color generation application 123 (FIG. 1). As shown in FIG. 6, the user interface 126 depicts a synopsis node 133; component nodes 136*a*, 136*b*, 136*c*, 136*d*, and 136*e*; component edges, 203*a*, 203*b*, 203*c*, 203*d*, and 203*e*; an outer color generator boundary 206, a color generator midpoint 209; a inner color generator boundary 213; halos 216*a*, 216*c*, and 216*e*; and a convergences, 403, 503, and 506.

As described above, a user may select the convergence color of a convergence that does not involve all of the halos 216 associated with the component nodes 136 located within the outer color generator boundary 206. In response, the color generation application 123 (FIG. 1) pushes out the component nodes 136 associated with the halos 216 not involved with the selected convergence. FIG. 6 represents a snap shot of the sequence of events involved when the convergence color of the convergence 506 is selected by the user. The component node 136*c* is not involved in the convergence 506 and thus when the convergence 506 is selected, the color generation application 123 pushes the component node 136*c* to be outside of the outer color generator boundary 206.

As shown in FIG. 6, the color generation application 123 is in the process of pushing the component node 136*c* to be outside of the outer color generator boundary 206. As the component node 136*c* gets farther away from the synopsis node 133, the radius of the halo 216*c* increases to correspond with the component edge 203*c*. Thus the size of the halo 216*c* increases and occupies a larger space. Accordingly, the size of the convergences 403 and 503 may increase. Additionally, the luminosity of the halo color of the halo 216*c* decreases as the component node 136*c* gets further away from the synopsis node 133. Thus, the halo 216*c* has less of an influence on the convergence color of the convergences 403 and 503. For example, the halo color of the halo 216*c* may be a less intense yellow as the luminosity of the yellow halo color decreases. The decrease in the luminosity of the halo color indicates that a smaller percentage of the component color 139 associated with the halo 216*c* will be applied. Accordingly, the convergence color of the convergence 403 changes to reflect less of an influence being effected by the halo 216*c*. Similarly, the convergence color of the convergence 503 changes to reflect less of an influence being effected by the halo 216*c*.

Additionally, the size of the selected convergence 506 may be adjusted to correspond with the increased size of the halo 216*c* associated with the component node 136*c* being pushed out. For example, the halo 216*c* is not involved in the selected convergence 506 and thus the size of the convergence 506 may decrease as the halo 216*c* increases. Further, the convergence color of the convergence 506 is not affected by the less intense yellow halo color of the halo 216*c* as the halo 216*c* is not involved in the convergence 506.

The selected color 129 depicted by the synopsis node 133 reflects the convergence color of the convergence 503. As described above, the selected color 129 corresponds to the convergence involving all of the halos 216 associated with component nodes 136 located within the outer color generator boundary 206. As shown in FIG. 6, the component node 136*c* is still located within the outer color generator boundary 206 and therefore the convergence 503 involves all of the halos 216*a*, 216*c*, and 216*e*. Accordingly, the selected color 129 corresponds to the convergence color of the convergence 503.

Figure 7:
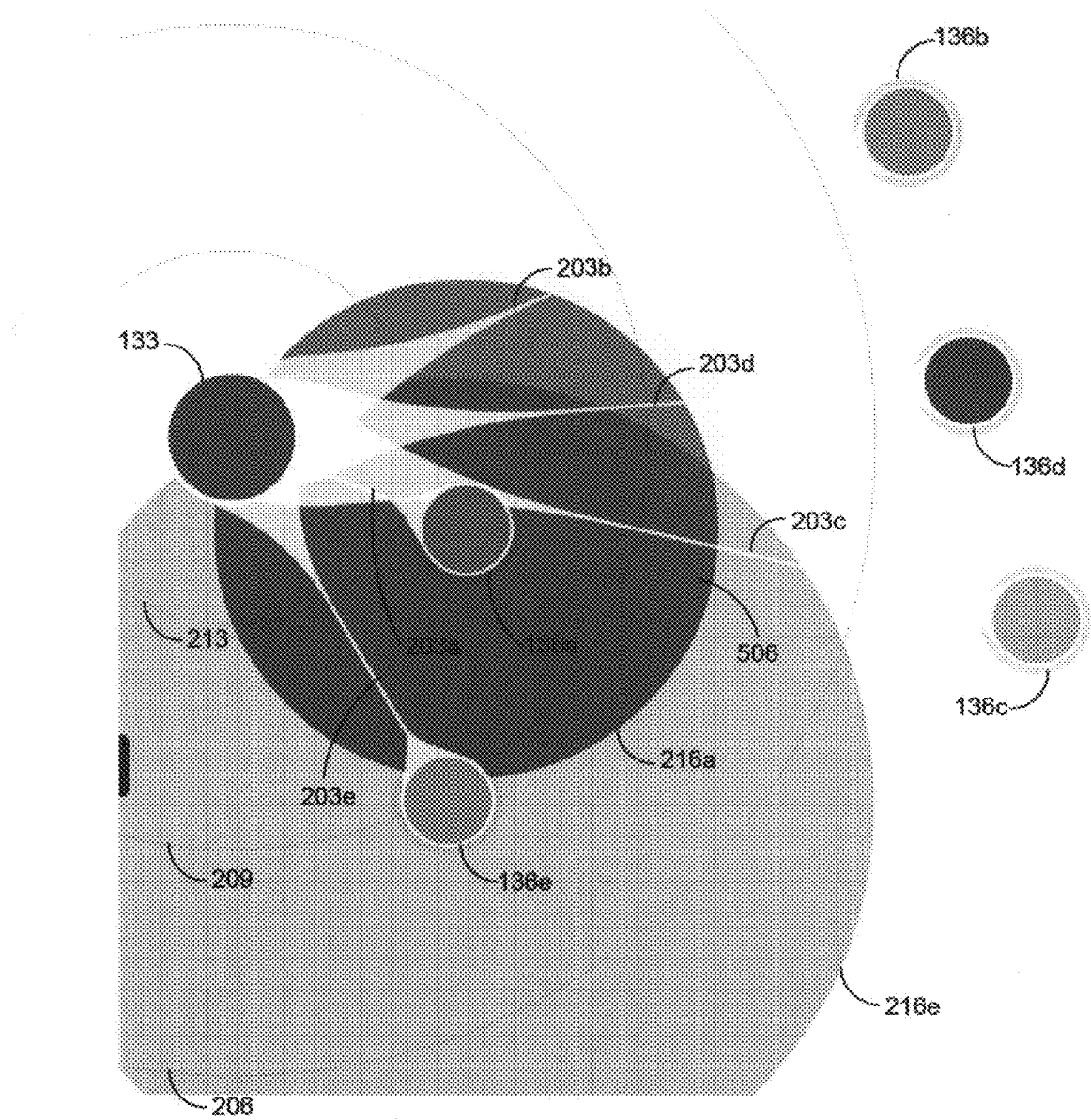
FIG. 7 illustrates an exemplary user interface depicting a color generator with the first component node and the third component node within the boundary.

FIG. 7 shows one example of a user interface 126 according to certain embodiments of the present disclosure that is rendered on the display 116. In this example, the user interface 126 depicts the color generator rendered by the color generation application 123 (FIG. 1). As shown in FIG. 7, the user interface 126 depicts a synopsis node 133; component nodes 136*a*, 136*b*, 136*c*, 136*d*, and 136*e*; component edges, 203*a*, 203*b*, 203*c*, 203*d*, and 203*e*; an outer color generator boundary 206, a color generator midpoint 209; a inner color generator boundary 213; halos 216*a* and 216*e*; and a convergence 506.

Shown in FIG. 7 is a snapshot after the color generation application 123 has completely pushed out the component node 136*c* to be outside of the outer color generator boundary 206. Therefore, the component node 136*c* is no longer associated with a visible halo 216. Accordingly, any convergences involving the halo 216*c* (FIG. 6) previously associated with the component node 136*c* are no longer present. The selected convergence 506 remains visible after the component node 136*c* is pushed outside of the outer color generator boundary 206. Additionally, the selected color 129 depicted by the synopsis node 133 corresponds to the convergence color of the convergence 506.

Figure 8:
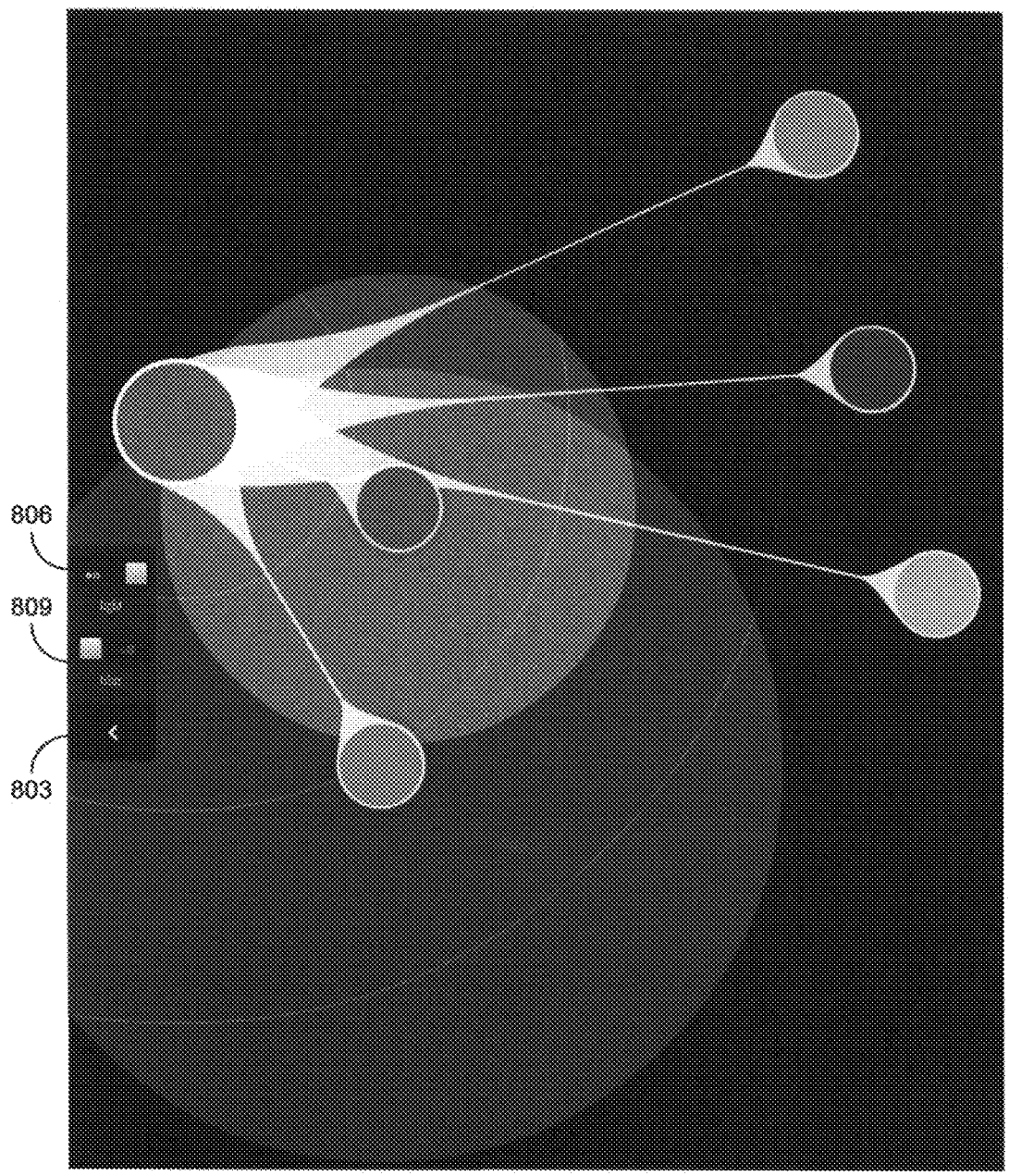
FIG. 8 illustrates an exemplary user interface depicting a color generator operating in an additive mode.

FIG. 8 shows one example of a user interface 126 according to certain embodiments of the present disclosure that is rendered on the display 116. In this example, the user interface 126 depicts the color generator rendered by the color generation application 123 (FIG. 1). The user interface 126 of FIG. 8 depicts the color generator operating in an additive manner where the colors associated with the component nodes 136 (FIG. 1) represent colored light sources. Additive light may conventionally be seen in computer monitors and televisions. In contrast, FIGS. 2-7 depict the color generator operating in a subtractive manner where light is removed to create the colors. For example, subtractive colors may conventionally be seen in paints, pigments, color filters, prints, photography, and/or other examples where light is subtracted.

Shown in FIG. 8 is settings panel 803 that includes a light switch 806 and a blur switch 809. In one embodiment, a user may hover over a portion of the user interface 126 via a touch input device and/or an other input device and in response, the color generation application 123 may render the settings panel 803. In another embodiment, the user may manipulate the user interface 126 in some other manner, such as, by clicking a component on the user interface 126 and/or striking a key or a combination of keys on a keyboard to request that the settings panel 803 be rendered.

In this example, the light switch 806 is shown as being in the "on" position. Accordingly, the color generator is shown as operating in the additive mode. The halo colors of the halos shown in FIG. 8 differ from the halo colors of the halos shown in FIG. 7. Additionally, the convergence color of the convergence involving the halos in FIG. 8 differs from the convergence color of the convergence involving the halos in FIG. 7. In one embodiment, the difference in the halo colors may be attributed to the mode of operation being additive mode instead of a subtractive mode. Thus, the color generation application 123 may provide for the color generator to access and generate colors for a different spectrum of colors via the additive and subtractive modes.

Figure 9:
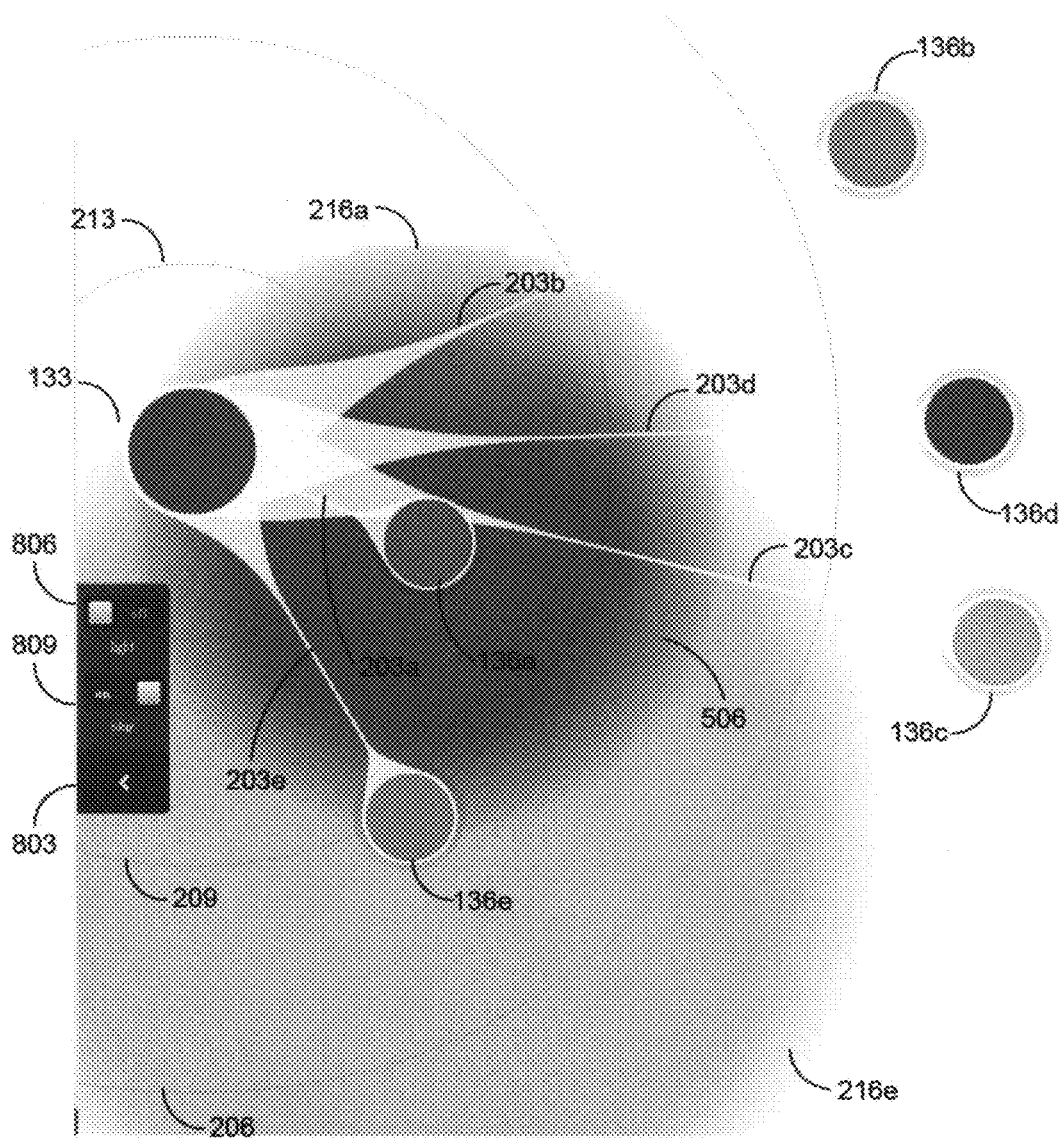
FIG. 9 illustrates an exemplary user interface depicting a color generator operating in a blurred mode.

FIG. 9 shows one example of a user interface 126 according to certain embodiments of the present disclosure that is rendered on the display 116. In this example, the user interface 126 depicts the color generator rendered by the color generation application 123 (FIG. 1). As shown in FIG. 9, the user interface 126 depicts a synopsis node 133; component nodes 136a, 136b, 136c, 136d, and 136e; component edges, 203a, 203b, 203c, 203d, and 203e; the outer color generator boundary 206, the color generator midpoint 209; the inner color generator boundary 213; halos 216a and 216e; the convergence 506; the settings panel 803, the light switch 806, and the blur switch 809.

The user interface 126 of FIG. 9 depicts the color generator operating in a blur mode. In one embodiment, a user may hover over a portion of the user interface 126 via a touch input device and/or an other input device and in response, the color generation application 123 may render the settings panel 803. In another embodiment, the user may manipulate the user interface 126 in some other manner, such as, by clicking a component on the user interface 126 and/or striking a key or a combination of keys on a keyboard to request that the settings panel 803 be rendered.

In this example, the blur switch 809 is shown as being in the "on" position. Accordingly, the color generator is shown as operating in blur mode. Responsive to a request to operate in blur mode, the color generation application 123 blurs the halos 216 of the component nodes 136 located within the outer color generator boundary 206. In one embodiment, the outer edges of the halos 216a and 216e are blurred and thus appear granular. However, the center portions of the halos 216a and 216e are not blurred and maintain a solid consistency. In one embodiment, an array of convergence colors may be associated with the convergence 506. For instance, blurred portions of the halos 216a and 216e may create a convergence color that differs from solid portions of the halos 216a and 216e. Additionally, a solid portion of the halo 216a may converge with a blurred portion of the halo 216e to create another convergence color. Similarly, a solid portion of the halo 216e may converge with a blurred portion of the halo 216a to create yet another convergence color. The halos 216a and 216e may exhibit varying degrees of the blurred effect thereby influencing the convergence color based on the degree of the blurred effect. Therefore, the convergence color of the convergence 506 varies at within the convergence area based on the degree of the blurred effect of each of the halos 216 forming the convergence.

Additionally, the selected color 129 (FIG. 1) is depicted in the synopsis node 133. In one embodiment, the selected color 129 may be the convergence color at a portion of the convergence 506 where the halos 216a and 216e forming the convergence 506 appear in a solid and consistent form. In another embodiment, the selected color 129 may be the convergence color at another portion of the convergence 506 where the halos 216a and/or 216e forming the convergence 506 appear blurred. A user manipulating the user interface 126 may select any of the convergence colors formed by the convergence 506 via the blurred effect to be the selected color 129.

Figure 10:
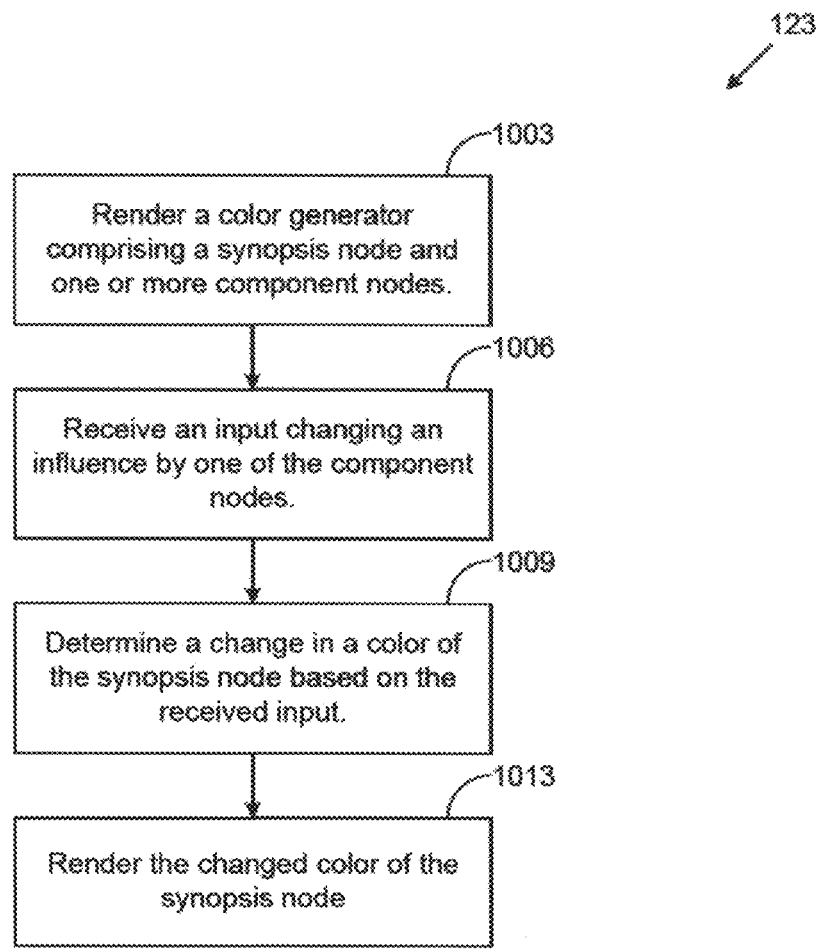
FIG. 10 is a flowchart illustrating an exemplary method of for generating a color based on a combination of a set of colors.

FIG. 10 is a flowchart that provides one example of the operation of a portion of the color generation application 123 according to certain embodiments. It is understood that the flowchart of FIG. 10 provides merely an example of the many different types of functional arguments that may be employed to implement the operation of the portion of the color generation application 123 as described herein. As an alternative, the flowchart of FIG. 10 may be viewed as depicting an example of steps of a method implemented in the computing device 103 (FIG. 1) according to one or more embodiments.

Beginning with step 1003, the color generation application 123 renders a user interface 126 that includes a color generator on a display 116 of the client device 103. The color generator comprises a synopsis node 133 and a plurality of component nodes 136. Each component node is associated with a halo 216 having a halo color that corresponds to a component color 139 of the respective component node 136 and a radius that corresponds to the distance between the respective component node 136 and the synopsis node 133. Additionally, the halo color of each halo 216 may be associated with a luminosity that corresponds to the distance between the respective component node 136 and the synopsis node 133. In one embodiment, only the halos 216 associated with component nodes 136 appearing within an outer color generator boundary 206 (FIG. 2) may be rendered on the display 116.

Next, in step 1006, the color generation application 123 receives an input to change an influence of one or more of the component nodes 136 on the synopsis color of the synopsis node 133. In one embodiment, the input to change the influence comprises an input to change the luminosity of the halo color of the halo 216 associated with the component node 136, an input to change a distance between the component node 136 and the synopsis node, an input to change a size of the halo 216 associated with the component node 136, and/or an input to change a position of the component node 136 with respect to the synopsis node 133. In response, the color generation application 123 may perform the requested change thereby changing the influence of the component node 136 on the synopsis color of the synopsis node 133.

In step 1009, the color generation application 123 determines a change in the synopsis color based on the received input. As described above, the synopsis color may be the selected color 129 that corresponds to a convergence color of a convergence involving the halos 216 of all of the component nodes 136 located within the outer color generator boundary 206. Thus, adjusting any one of the luminosity of the halo colors, the distance between the component node 136 and the synopsis node 133, the size of any one of the halos 216, or the position of the component node 136 with respect to the synopsis node 133 may influence the convergence color. For example, the halo color of one of the halos 216 involved in the convergence may change when the luminosity is adjusted. The luminosity of the halo color may depend on the distance between the component node 136 and the synopsis node, as described above. Additionally, adjusting the size of the halo 216 and/or the position of the respective component node 136 with respect to the synopsis node 133 may change the halo's 216 involvement in the convergence, thereby influencing the convergence color.

Then, in step 1013, the color generation application 123 may render the changed synopsis color in the synopsis node 133. The color generation application 123 may adopt the synopsis color as the selected color 129 that is then extracted for use in other applications, as can be appreciated. For example, the selected color 133 may be extracted for use with Adobe® Kuler®, as discussed above.

Figure 11:
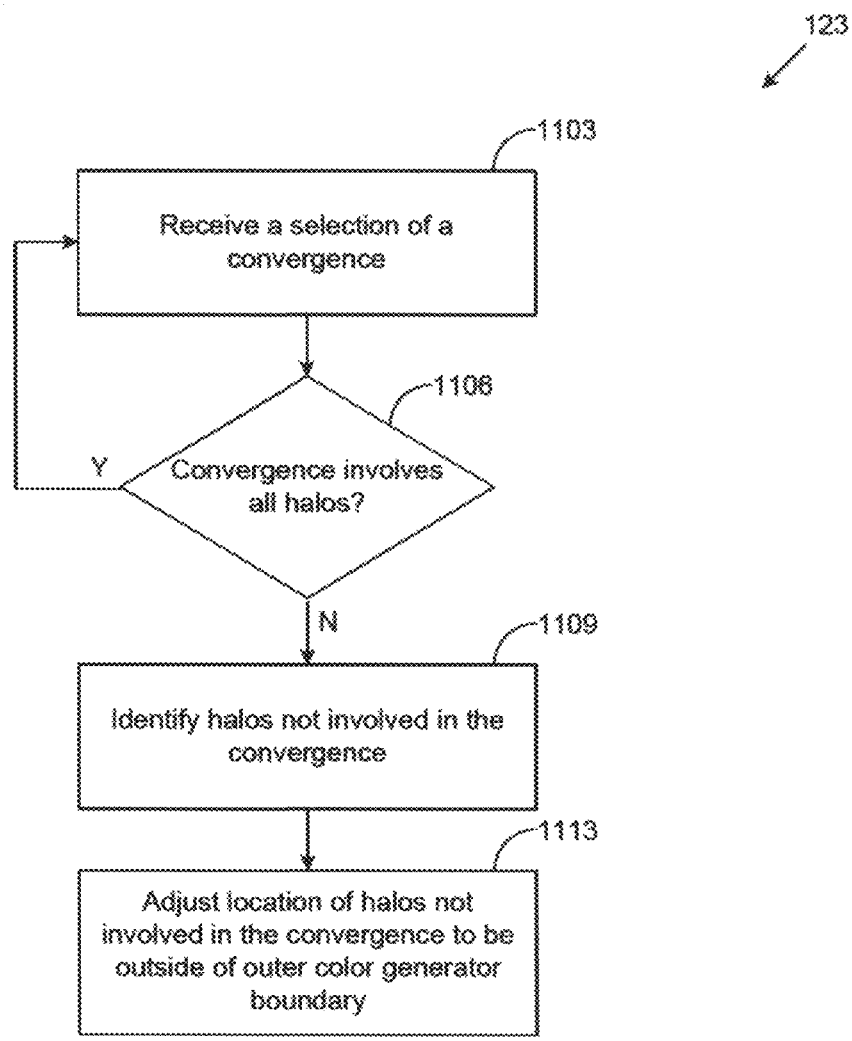
FIG. 11 is a flowchart illustrating an exemplary method of adjusting the relevant component nodes on the user interface based on a user selection.

FIG. 11 is a flowchart that provides one example of the operation of a portion of the color generation application 123 according to certain embodiments. It is understood that the flowchart of FIG. 11 provides merely an example of the many different types of functional arguments that may be employed to implement the operation of the portion of the color generation application 123 as described herein. As an alternative, the flowchart of FIG. 11 may be viewed as depicting an example of steps of a method implemented in the computing device 103 (FIG. 1) according to one or more embodiments.

Beginning with step 1103, the color generation application 123 receives a selection of a convergence formed by at least two of halos 216 (FIG. 5) each associated with a component node 136. For example, a user interface 126 rendered on a display 116 (FIG. 1) of a client computing device 103 may include a number of component nodes 136 that are each located within the outer color generation boundary 206 (FIG. 2). Thus, each of the component nodes 136 may be associated with a halo 216 that has a luminosity greater than 0%, as described above. In one embodiment, the halos 216 may intersect with each other at a number of locations in the user interface 126 to form one or more convergences. The selected color 133 may be automatically depicted in the synopsis node 133 (FIG. 5) as corresponding to the convergence color of a convergence involving all of the halos 216. However, a user manipulating the user interface 126 may wish to select another convergence color to be the selected color 129. The user may select a convergence via a touch input device, a mouse, and/or another input device and the color generation application 123 may receive the selection of the convergence.

Next, in step 1106, the color generation application 123 determines whether the convergence selected by the user involves the halos 216 associated with all of the component nodes 136 located within the outer color generation boundary 206. For example, with reference to FIG. 5, the convergence 503 involves the halos 216 of all of the component nodes 136 located within the outer color generation boundary 206. In particular, the convergence 503 involves halo 216a, 216c and 216e that are associated with component nodes 136a, 136c, and 136e, respectively, and thus the convergence color of the convergence 503 may be automatically depicted in the synopsis node 133 as the selected color 129. The user may instead desire that the selected color 129 be the convergence color of the convergence 506. In response to receiving the selection, the color generation application 123 determines whether the selected convergence involves all of the halos 216a, 216c, and 216e. In this example, the color generation application 123 determines that only halos 216a and 216e are involved in the convergence 509. Thus, the color generation application 123 determines that not all of the halos 216 associated with component nodes 136 located within the outer color generation boundary 206 are involved in the selected convergence and advances to step 1109. However, if the color generation application 123 determines that all of the halos 216 associated with component nodes 136 located within the outer color generation boundary 206 are involved in the selected convergence, then the color generation application 123 returns to step 1103 to receive another selection.

In step 1109, the color generation application 123 identifies which of the halos 216 are not involved in the selected convergence. Using the above example, the color generation application 123 identifies that the halo 216c is not involved in the selected convergence. Then, in step 1113, the color generation application 123 adjusts the location of the component nodes 136 associated with the identified halos 216 to be outside of the color generator boundary 206. Referring to the above example, the color generation application 123 pushes the component node 136c to be outside the outer color generation boundary 206, as shown in FIGS. 6 and 7. For example, the color generation application 123 may render the component node 136c being pushed out of the outer color generation boundary 206 as shown in FIG. 6. The halo 216c may increase in size and the luminosity of the halo color for the halo 216c may decrease as the distance between the component node 136c and the synopsis node 133 increases, as disclosed herein, as shown in FIG. 6. The color generation application 123 may push the component node 136c until the component node 136c is outside of the outer color generation boundary 206, as shown in FIG. 7.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
rendering, by a processor, an interface comprising a synopsis node and a plurality of configurable component nodes, each of the component nodes corresponding to a respective color, and the synopsis node having a color that is a combination of the colors of the component nodes, the component nodes extending in a radial manner from the synopsis node, wherein each component node is associated with a halo, the halo having a halo color that corresponds to the color associated with the component node, the halo having a radius that corresponds to a distance between the component node and the synopsis node and a luminosity of the halo color that corresponds to the distance;
receiving, by the processor, input changing an influence of a color of a first component node on the color of the synopsis node by:
moving the first component node closer to the synopsis node to increase the influence of the first component node on the synopsis node color; or
moving the first component node farther from the synopsis node to decrease the influence of the first component node on the synopsis node color;
determining, by the processor, a change in the color of the synopsis node based on the received input, the changed color representing a combination of the colors of the component nodes, wherein the respective distances of the component nodes from the synopsis node are used to determine influences of the respective colors of the component nodes on the synopsis node color, wherein component nodes closer to synopsis node are more influential than component nodes that are farther from the synopsis node; and
rendering, by the processor, the changed synopsis node color in the synopsis node.

2. The method of claim 1, wherein the input changing the influence of the first component node is input changing the distance of the first component node from the synopsis node to change the amount of influence by the color of the first component node on the color of the synopsis node.

3. The method of claim 1 further comprising displaying an indicator indicating an influence boundary, the influence boundary graphically representing a boundary between different amounts of influence between component nodes within the boundary and component nodes outside the boundary.

4. The method of claim 3, wherein the color of synopsis node is a combination of only the colors of the component nodes that are within the boundary.

5. The method of claim 3 further comprising displaying a second distance indicator indicating a second influence boundary, wherein:

the influence of component nodes within the first influence boundary is greater than component nodes within the second influence boundary but not within the first influence boundary; and
the influence of component nodes within the second influence boundary is greater than component nodes not within the second influence boundary.

6. The method of claim 1, wherein each one of the component nodes are connected to the synopsis node with a graphical representation.

7. The method of claim 1, wherein a color for each of the component nodes is individually selected.

8. The computer-implemented method of claim 1, wherein the luminosity increases as the component node is adjusted to be closer to the synopsis node.

9. The computer-implemented method of claim 1, further comprising only rendering the halo of each component node located within a predetermined color generator boundary.

10. The method of claim 1, further comprising rendering an adjustment of a radius of a halo associated with the component node to correspond to a distance first component node to the synopsis node after moving the first component node.

11. The method of claim 1, further comprising rendering an adjustment of the luminosity of a halo color associated with the component node to correspond to a distance first component node to the synopsis node after moving the first component node.

12. The method of claim 1, further comprising rendering a plurality of convergences of halos associated with at the component nodes when the halos intersect, each convergence having a convergence color based at least in part on halo colors of the intersecting halos.

13. The method of claim 12 further comprising:
receiving an input selecting a convergence;
identifying a convergence color associated with the selected convergence;
changing the color of the synopsis node to the identified convergence color; and
rendering the synopsis node with the changed color and changed component nodes with changed colors, the changed color of the synopsis node being a combination of the changed colors of the changed component nodes.

14. The method of claim 1 wherein each component node is associated with a luminosity determined based on the distance between the respective component node and the synopsis node, the luminosity of the respective component node used in combining colors of the component nodes to create the synopsis node color.

15. A computer-implemented method comprising:
rendering, on a display, an interface comprising a color generator, the interface including a synopsis node and a plurality of component nodes, each of the component nodes being associated with a respective component color and the synopsis node being associated with a synopsis color, wherein each component node is associated with a halo, the radius of the halo corresponding to the distance between the respective component node and the synopsis node;
receiving an input adjusting a location of the component node with respect to the synopsis node;
determining, via a processor, a change in the synopsis color based on the received input; and
rendering, on the display, the changed synopsis color.

16. The computer-implemented method of claim 15, wherein the synopsis color represents a combination of the component colors associated with components nodes located within a boundary.

17. The computer-implemented method of claim 15, further comprising:
rendering the halos of each of the component nodes, each halo having a halo color corresponding to the component color; and
rendering a convergence of the halos where the halos of at least two of the component nodes intersect, the convergence having a convergence color representing a combination of the halo colors of the intersecting halos.

18. The computer-implemented method of claim 17, wherein each halo color is associated with a luminosity, the luminosity corresponding to the distance between the respective component node and the synopsis node and the luminosity determining an amount of influence of the halo color on the convergence color.

19. The computer-implemented method of claim 15, further comprising:
receiving an input for operating in an additive mode;
determining a change in the synopsis color based on the received input; and
rendering the changed synopsis color in the synopsis node.

20. The computer-implemented method of claim 15, further comprising:
receiving an input for operating in a blurred mode;
in response to the received input, blurring the component colors;
determining a change in the synopsis color based on the blurred component colors; and
rendering the changed synopsis color in the synopsis node.

21. A non-transitory computer-readable medium on which is encoded program code, the program code comprising:
program code for rendering a color generator on a user interface, the color generator comprising a plurality of component nodes and a synopsis node, each component node being associated with a component color and the synopsis node being associated with a synopsis color;
program code for rendering a halo associated with each component node located within a boundary, the halo having a halo color that corresponds to the component color and having a radius that corresponds to a distance between the respective component node and the synopsis node;
program code for rendering a convergence of the halos, the convergence area having a convergence color that represents a combination of all the halo colors involved in the convergence; and
program code for modifying the synopsis color to correspond to the convergence color.

22. The non-transitory computer-readable medium of claim 21, further comprising:
program code for determining a luminosity for each halo color, the luminosity being based at least in part on the distance between the respective component node and the synopsis node; and
program code for adjusting the halo color of each halo to correspond to the determined luminosity.

23. The non-transitory computer-readable medium of claim 21, further comprising:
program code for receiving an input to modify the synopsis color; and
program code for rendering a change in the synopsis color based on the received input.

24. The non-transitory computer-readable medium of claim 23, wherein the input to modify the synopsis color comprises at least one of an input to modify the distance between one of the component nodes and the synopsis node or an input to modify a location of one of the component nodes with respect to the synopsis node.

* * * * *